United States Patent
Luo et al.

(10) Patent No.: US 10,528,749 B2
(45) Date of Patent: Jan. 7, 2020

(54) METHODS AND APPARATUS FOR CONTAINERIZED SECURE COMPUTING RESOURCES

(71) Applicant: Huawei Technologies Co., Ltd., Shenzhen (CN)

(72) Inventors: Zhigang Luo, Vaughan (CA); Yuri Poeluev, Waterloo (CA); Alan Pak-Lun Ho, Unionville (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 15/463,539

(22) Filed: Mar. 20, 2017

(65) Prior Publication Data

US 2018/0268156 A1 Sep. 20, 2018

(51) Int. Cl.
*G06F 21/62* (2013.01)
*G06F 21/53* (2013.01)

(52) U.S. Cl.
CPC .......... *G06F 21/6218* (2013.01); *G06F 21/53* (2013.01)

(58) Field of Classification Search
None
See application file for complete search history.

(56) References Cited

U.S. PATENT DOCUMENTS

| | | | |
|---|---|---|---|
| 8,438,654 B1* | 5/2013 | von Eicken | G06F 21/53 709/217 |
| 2009/0125902 A1* | 5/2009 | Ghosh | G06F 9/45533 718/1 |
| 2014/0380447 A1* | 12/2014 | Chhabra | G06F 9/44526 726/7 |
| 2015/0244718 A1* | 8/2015 | Smets | G06F 21/41 726/7 |
| 2015/0293777 A1 | 10/2015 | Shanbhogue et al. | |
| 2016/0253670 A1* | 9/2016 | Kim | G06Q 20/4012 705/72 |
| 2017/0061441 A1* | 3/2017 | Kamal | G06Q 20/40145 |
| 2017/0214530 A1* | 7/2017 | Seibel | H04L 9/3234 |
| 2019/0005229 A1* | 1/2019 | Hlaing | G06F 8/61 |

FOREIGN PATENT DOCUMENTS

| | | |
|---|---|---|
| CN | 101944013 A | 1/2011 |
| CN | 104375890 | 2/2015 |
| CN | 105631284 A | 6/2016 |
| WO | 2017034811 A1 | 3/2017 |

* cited by examiner

*Primary Examiner* — Henry Tsang
(74) *Attorney, Agent, or Firm* — Slater Matsil, LLP

(57) ABSTRACT

A computing device has first and second operating systems with access to separate first and second memories. The second operating system hosts containers which provide separate execution environments. The containers have secure computing resources. A software module in the second operating system receives access requests from applications in the first operating system and selectively passes the requests based on rules for accessing the containers.

18 Claims, 15 Drawing Sheets

METHODS AND APPARATUS FOR CONTAINERIZED SECURE COMPUTING RESOURCES

FIELD

This relates to computing devices, and in particular, to systems and methods for managing access to secure resources in computing devices.

BACKGROUND

Modern computing devices are used for a wide variety of purposes, many of which involve data that is private, proprietary or sensitive to the user or to other entities. For example, devices such as smart phones are often used to store financial data such as account numbers, payment credentials, biometric data such as fingerprints, PINs and passwords. In addition, computing devices commonly store encryption keys and the like, for example, for secure communication and document storage or for playback of copy-protected media. Such data is valuable to users and to other entities such as software developers, enterprises, financial institutions and media owners and publishers.

Protection of sensitive data (in particular, against unauthorized access to such data) is important. Allowing for fast and convenient access to data for legitimate purposes by both users and software developers is also important for providing a broad feature set of devices.

It is becoming increasingly common for devices to be used in multiple modes. For example, computing devices may be used in portable or handheld modes and in desktop modes. Different sets of functionality and different user interfaces may be desired in each mode. In addition, users may use a single device for both personal and professional purposes. Enterprises may wish to segregate data from personal data of employees, and employees may likewise wish to maintain separation for privacy reasons.

SUMMARY

An example computing device comprises: a processor configured to provide: a first operating system with access to a first memory; and a second operating system with access to a second memory and hosting a plurality of containers providing separate execution environments, each of said plurality of containers having secure computing resources; a software module executable within said second operating system for receiving access requests from applications in said first operating system and selectively passing said requests to said secure computing resources based on container access rules.

In some embodiments, the first operating system hosts a plurality of containers providing separate execution environments, each said container of said first operating system corresponding to a container of said second operating system.

In some embodiments, the container access rules comprise a concordance between said containers of said first operating system and said containers of said second operating system.

In some embodiments, the computing device comprises a software module executable in said first operating system for generating access requests each including a value identifying a container from which the access request originated.

In some embodiments, the access rules depend on said value identifying a container from which the access request originated.

In some embodiments, the secure computing resources may comprise trusted applications in said containers of said second operating system.

In some embodiments, first and second containers of said second operating system have respective instances of a trusted application.

In some embodiments, the access requests comprise requests for return of secure data.

In some embodiments, the access requests comprise requests to perform operations using said secure computing resources.

In some embodiments, the first operating system defines a rich execution environment and said second operating system defines a trusted execution environment, each as defined by the Global Platform TEE system architecture.

Computing devices disclosed herein may include the above features in any combination.

An example method of access control occurs on a computing device comprising a first operating system and a second operating system hosting a plurality of containers providing separate execution environments and each having secure computing resources. The method comprises: sending a request from a first software module in said first operating system to said second operating system, said request directed to a secure computing resource in a targeted one of said containers; in a second software module in said second operating system: receiving said request; evaluating said request according to access rules for said one of said containers; and selectively passing said request to said secure computing resource based on said access rules.

In some embodiments, the first operating system hosts a plurality of containers providing separate execution environments, and said request is sent from one of said containers of said first operating system.

In some embodiments, the method comprises, in said first software module, receiving said request from an application in one of said containers of said first operating system, and passing said request to said second operating system with a value identifying said one of said containers.

In some embodiments, the evaluating said request comprises checking an identifier of said targeted container against a list of containers hosted at said second operating system.

In some embodiments, the evaluating said request comprises checking a concordance between said containers of said first operating system and said containers of said second operating system.

In some embodiments, the evaluating said request comprises checking an identifier of said secure resources against a list of resources in said targeted container.

In some embodiments, the secure computing resources comprise trusted applications in said containers of said second operating system.

In some embodiments, first and second containers of said second operating system have respective instances of a trusted application.

Methods disclosed herein may include the above features in any combination.

An example computer-readable medium has instructions thereon for execution by a processor, said instructions comprising: a first software module for sending a request from a first software module in a first operating system to a second operating system, said request directed to a secure computing resource in a container hosted by the second operating system; a second software module for execution in said second operating system, for: receiving said request; evaluating said request according to access rules for said container; and selectively passing said request to said secure computing resource based on said access rules.

In some embodiments, the first operating system hosts a plurality of containers providing separate execution environments, and said request is sent from one of said containers of said first operating system.

DETAILED DESCRIPTION

Figure 1:
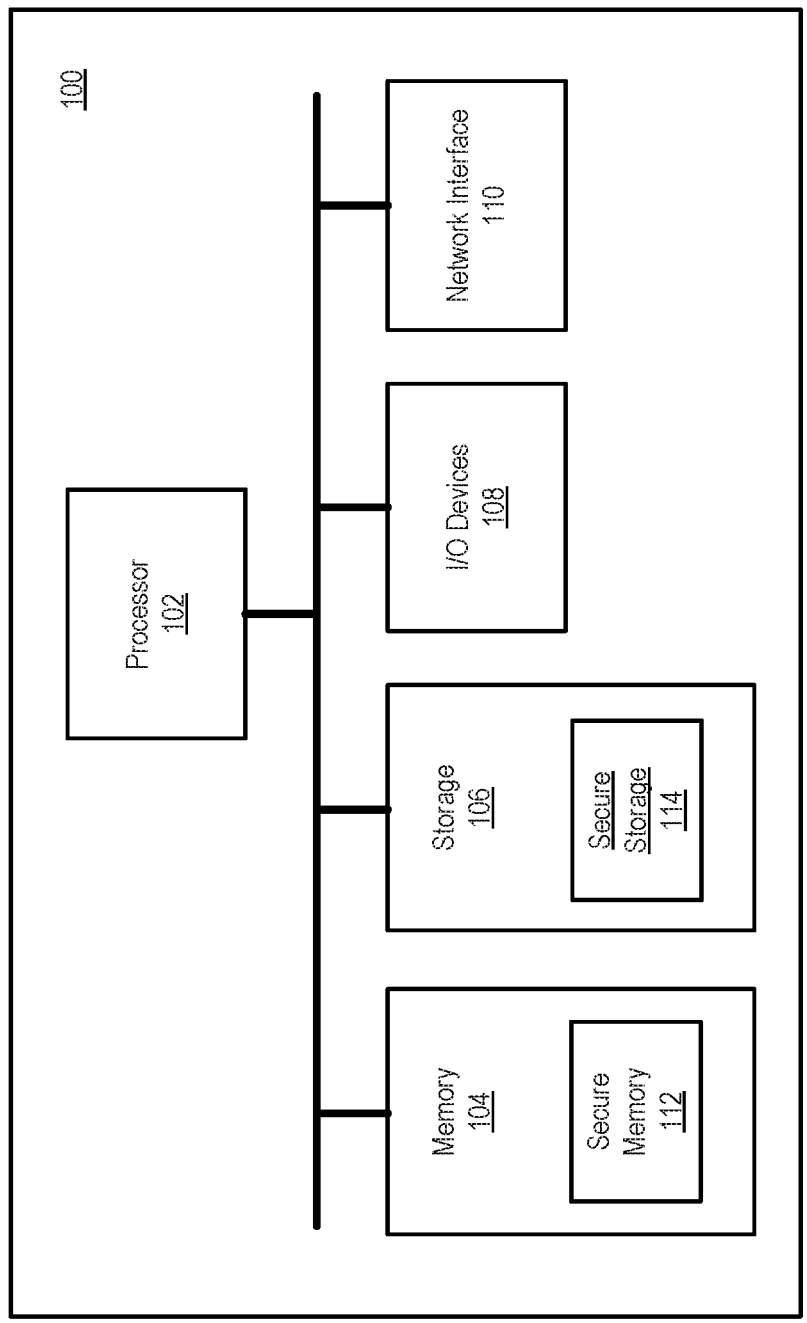
FIG. 1 is a block diagram of a computing device.

FIG. 1 is a schematic diagram of an example computing device 100. Computing device 100 may be, for example, a smart phone, tablet computer, personal computer such as a notebook computer, wearable computing device or the like.

As will be described in further detail, computing device 100 has hardware and software resources divided into multiple execution environments. One execution environment has elevated access restrictions and is used for secure storage and processing of some computing resources, which may be referred to as secure computing resources.

Computing device 100 includes a processor 102, memory 104, storage 106, one or more input/output (I/O) devices 108, and at least one network interface 110. Components of computing device 100 are formed in one or more semiconductor chips, mounted to a printed circuit board for communication between components. In some embodiments, multiple components, e.g. processor 102 and network interface 110 are incorporated in a single semiconductor chip, referred to as a system-on-chip. In other embodiments, each component is a discrete chip.

Processor 102 is any suitable type of processor, such as a processor implementing an ARM or x86 instruction set.

Memory 104 is any suitable type of random-access memory accessible by processor 102. Memory 104 includes a secure memory 112. In some embodiments, secure memory 112 is a discrete physical module. In other embodiments, memory 104 is segmented to define secure memory within the same physical module as other memory. In some embodiments, secure memory 112 occupies a range of memory addresses within the address space of memory 104. In some embodiments, secure memory 112 is accessible by processor 102 within a different memory space.

Storage 106 may be, for example, one or more modules of NAND flash memory of suitable capacity, or may be one or more hard drives or other persistent computer storage device. Storage 106 includes a secure storage 114. In some embodiments, secure storage 114 resides on a device shared with other storage 106. In other embodiments, secure storage 114 resides on a discrete hard drive, flash storage module or the like.

I/O devices 108 include, for example, user interface devices such as a screen, such as a capacitive or other touch-sensitive screen capable of displaying rendered images as output and receiving input in the form of touches. In some embodiments, I/O devices 108 additionally or alternatively includes one or more of speakers, microphones, sensors such as accelerometers and global positioning system (GPS) receivers, keypads or the like. In some embodiments, I/O devices 108 include ports for connecting computing device 100 to other computing devices. In an example, I/O devices 108 include a universal serial bus (USB) controller for connection to peripherals or to host computing devices.

Network interface 110 is capable of connecting computing device 100 to one or more communication networks. In some embodiments, network interface 110 includes one or more wireless radios, such as Wi-Fi or cellular (e.g. GPRS, GSM, EDGE, CDMA, LTE or the like).

Computing device 100 operates under control of software programs. Computer-readable instructions are stored in storage 106 or secure storage 114, and executed by processor 102 in memory 104 or secure memory 112.

Figure 2:
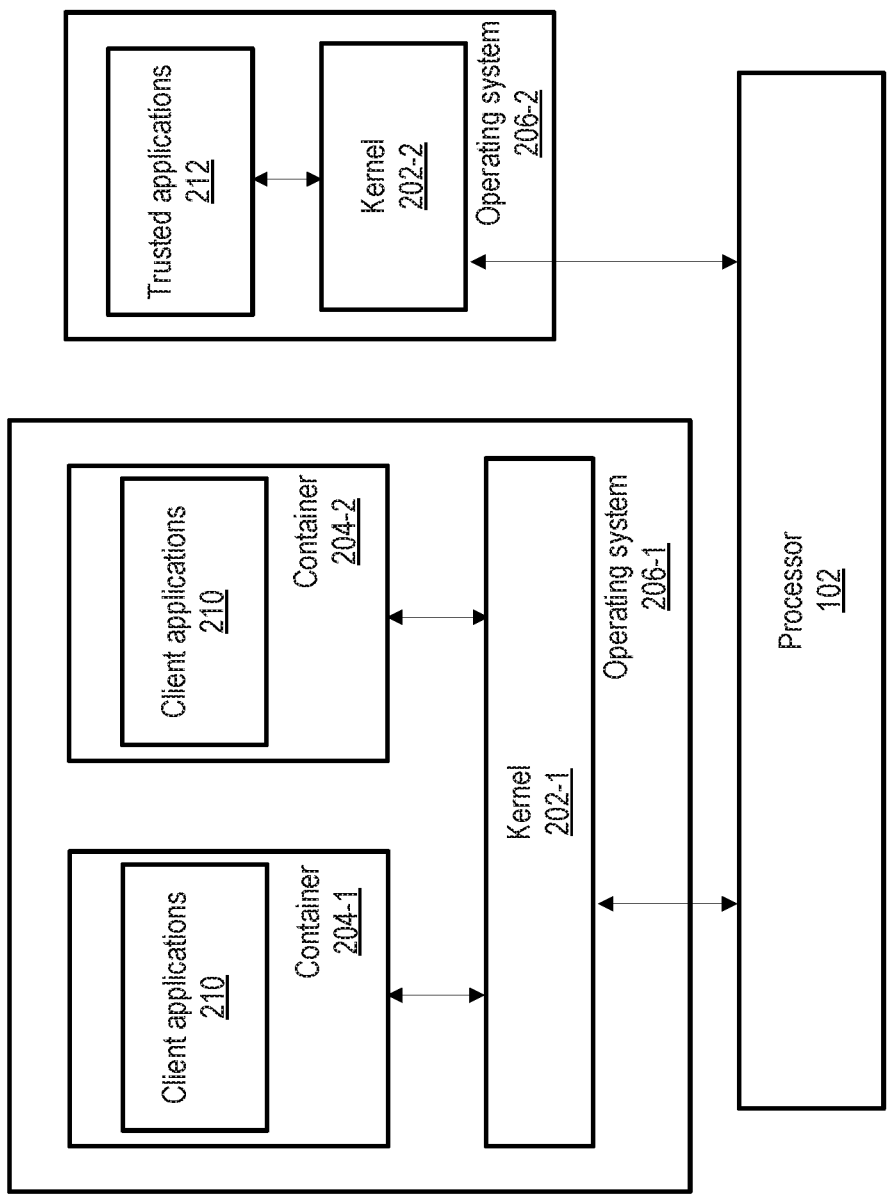
FIG. 2 is a block diagram showing software components at the computing device of FIG. 1.

FIG. 2 is a schematic block diagram showing organization of software at computing device 100. As depicted, computing device 100 has two separate executing environments provided by operating systems 206-1, 206-2 (individually and collectively, operating systems 206). Operating system 206-1 has access to resources in memory 104 and storage 106 (FIG. 1) and operating system 206-2 has access to secure memory 112 and secure storage 114. In the depicted embodiment, processor 102 is configured with logic for maintaining separation between the executing environments provided by operating systems 206-1, 206-2. In an example, processor 102 includes one or more ARM Cortex-A™ cores and includes TrustZone™ technology with secure monitor logic for switching between executing environments. Other implementations are possible. As noted, secure memory 112 may be located in a separate physical memory module from memory 104. Alternatively or additionally, secure memory 112 may be accessible in a different address space or in a different address range. Likewise, secure storage 114 may be located in a separate physical memory device or in a different partition or sector of storage 106.

In an example, operating system 206-1 is a rich operating system capable of providing multiple discrete execution environments in containers 204. As depicted, two containers 204-1 and 204-2 are present within operating system 206-1. However, any number of containers 204 may be present.

Each container 204 corresponds to an instance of an operating system, which may be a virtualized operating system hosted within operating system 206-1. A kernel 202-1 of operating system 206-1 provides software within each container with access to hardware of computing device 100. The operating systems within containers 204 may be operating systems of the same or similar type as operating system 206-1. In an example embodiment, operating system 206-1 is a version of Linux and the operating systems in containers 204-1, 204-2 are versions of Android or other Linux-based operating systems. In other embodiments, one or more of operating system 206-1 and the operating systems in containers 204-1, 204-2 are other types of operating systems, such as Microsoft Windows or Apple OS X or iOS. Operating system 206-1 may include a translation or emulation layer.

Containers 204-1, 204-2 provide separated execution environments, In an example, container 204-1 hosts an operating system for personal use and container 204-2 hosts an operating system for professional use.

Each container 204 hosts one or more client applications 210. Client applications 210 are installable by users, for example, by execution of application packages. Application packages may be retrieved from software repositories or stores, such as the Google Play Store for Android applications, the Apple App Store for iOS applications, the Windows store for Windows applications, and various repositories for applications on distributions of Linux-based operating systems. Alternatively, applications may be obtained and installed from other sources.

Application packages, particularly those distributed through software stores or repositories, typically adhere to standardized formats. Application packages can contain, among others, human or computer-readable code, compiled binaries, application resources such as databases, and metadata identifying properties such as the application name, publisher, compatible file types and the like. For example, Android applications distributed through the Google Play Store are provided in compressed, digitally-signed .apk packages, which include a unique application ID, e.g. "com.publisher.app1".

Containers 204-1, 204-2 segregate their respective client applications 210 from one another. That is, client applications 210 in container 204-1 cannot directly access data associated with container 204-2 and vice-versa. Thus, for example, data associated with an email client application 210 in container 204-1 cannot be accessed by any application in container 204-2.

Operating system 206-2 hosts one or more trusted applications 212. Trusted applications 212 are installed in secure storage 114. Operating system 206-2 is configured so that trusted applications 212 cannot be installed by users without providing credentials for elevated permissions. In an example, secure storage 114 is not writable by end users. Rather, secure storage 114 can be modified only by system-level processes or applications, e.g. as part of updates issued by the manufacturer of computing device 100, or by certain specific digitally signed application packages. Trusted applications 212 are therefore "trusted" in the sense that the installation process ensures that they are verified as legitimate applications from authorized sources.

Each trusted application 212 has access to secure data. For at least some functions, client applications 210 rely on such data. Client applications are therefore able to send requests to trusted applications 212, e.g. for secure data to be returned, or for operations to be performed using secure data.

Sharing of information between trusted applications 212 and client applications 210 is based on rules defining requirements for secure computing resources, such as access to trusted applications 212 or data stored by trusted applications 212, to be shared with a client application 210.

Because client applications 210 are user-installable, they might not be subject to the same degree of verification prior to installation as trusted applications 212. Accordingly, it is possible for client applications 210 to be installed that are malicious, coded without proper protection of secure data, or associated with entities that are not authorized to access secure data. The term "trust model" refers to protective measures that are taken to guard against access except by authorized applications and users.

Client applications 210 in both of containers 204-1 and 204-2 may require access to secure data for some functions. Accordingly, client applications 210 in both containers are provided with the ability to request access to data associated with trusted applications 212 or to request performance of operations by trusted applications 212. However, just as software in containers 204-1 and 204-2 cannot access one another's data, it may likewise be desired to prevent access by software in container 204-1 to secure data and operations for container 204-2 and vice-versa. For example, it may be desired to prevent access to enterprise communication data by personal applications, and to prevent access to personal payment data by enterprise applications.

In order to prevent leakage of personal data to enterprise applications and vice-versa, computing device 100 is configured so that access to trusted applications 212 and their secure data is controlled based on container and client application.

Figure 3:
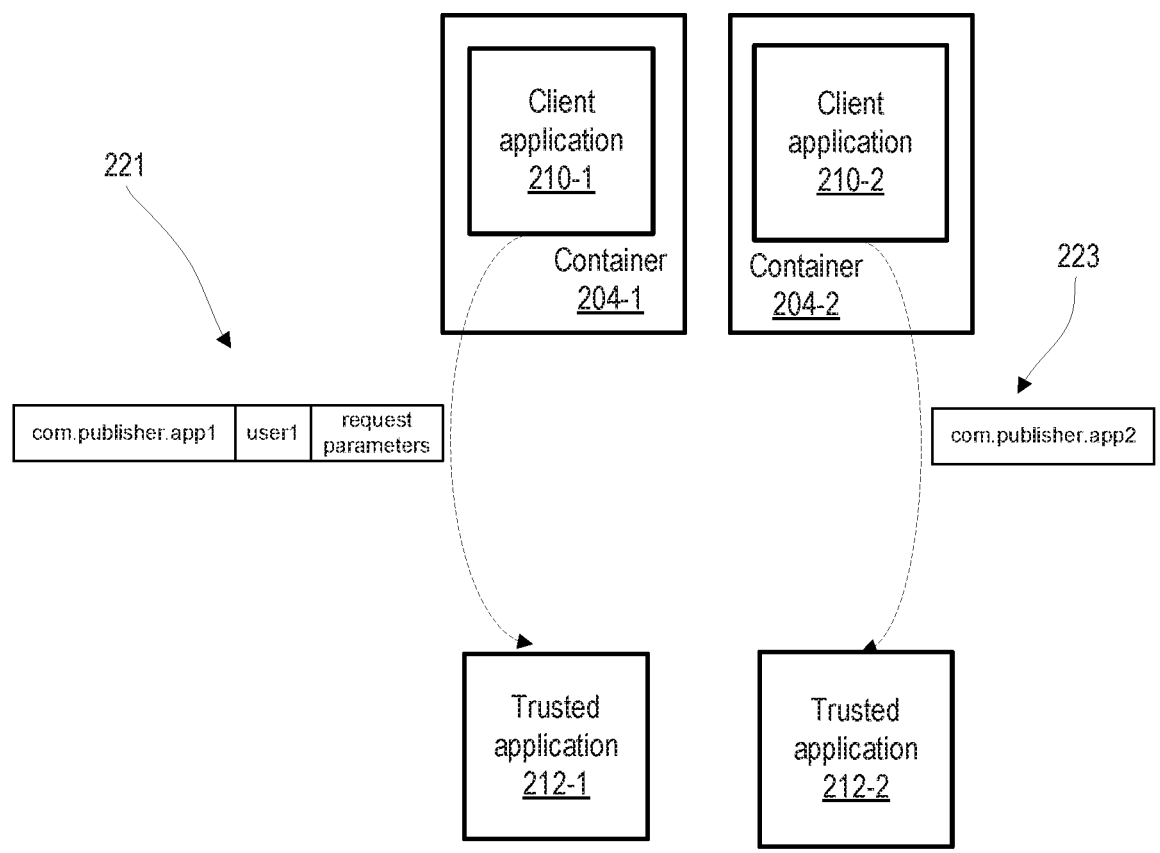
FIG. 3 is a schematic diagram showing a flow of messages between client applications and trusted applications at a computing device.

FIG. 3 depicts an example mechanism for permitting controlled access to secure data, for example, exchanging or sharing data between client applications 210 and trusted applications 212. As shown, personal-use container 204-1 hosts a client application 210-1 for financial payments and professional use container 204-2 hosts a client application 210-2 for encrypted access to enterprise resources, such as email, documents or the like. Client application 210-1 has associated payment credential information stored by a trusted application 212-1 in operating system 206-2, namely a credential storage utility. Client application 210-2 has associated encryption/decryption key information stored by a trusted application 212-2 in operating system 206-2, namely an encryption/decryption utility. Trusted application 212-1 has access to a data structure (e.g. a database) of financial account information or credentials. Trusted application 212-2 has access to a data structure (e.g. a database) of encryption keys for encrypting and decrypting data such as communications and documents.

Each of trusted application 212-1 and trusted application 212-2 is configured to receive requests from client applications 210 in containers 204. Trusted applications 212-1, 212-2 are further configured to perform permissions checks in response to receiving such requests. The security checks are configured in view of the type of information stored by each trusted application 212. Specifically, in some embodiments, trusted application 212-1 stores credentials belonging to multiple users and associated with a specific client application 210 in container 204-1. In order to confirm that a request for credentials is authorized, trusted application 212-1 is configured to check the name of the requesting application and the user id of the user making the request. Accordingly, in order to make a request intended for trusted application 212-1, client application 210-1 is configured to construct a message 221 containing its application ID, "com.publisher.app1", the user ID of the active user and one or more parameters defining the request. In contrast, trusted application 212-2 stores encryption keys associated with specific content, rather than any particular user. Accordingly, to confirm that a request is authorized, trusted application 212-2 might check only the application ID of the client application making the request. Therefore, in order to request secure data from trusted application 212-2, client application 210-2 constructs a message 223 containing its application ID, "com.publisher.app1".

Unfortunately, access management by individual trusted applications in this manner has disadvantages. For example, each trusted application 212 needs to be configured to receive some credentials from client applications 210. The credentials required by any given trusted application 212, or the format in which they are required, may vary. Accordingly, developers of client applications 210 would need to customize client applications 210 in view of the configuration of each trusted application 212. Moreover, changes to any trusted application 212 would need to be reflected in any client applications 210 requiring access to the trusted application's data.

In addition, each trusted application 212 might need to maintain an up-to-date record of all authorized client applications 210, e.g. based on application names or IDs. Maintaining such records may be burdensome. Application names and application IDs are publicly accessible—for example, such information can be extracted from some types of application packages and could therefore be forged by malicious client applications 210, making secure data vulnerable to unauthorized access. Moreover, trusted applications 212 cannot control access based on containers 204 unless they are explicitly made aware of containers 204. Such a configuration may be difficult to implement by developers of trusted applications 212 because the arrangement of containers 204 varies from device to device. Conversely, controlling access based only on client applications 210 invites problems of data leakage. For example, a trusted application 212 may not be able to differentiate between duplicate instances of a specific client application 210 in containers 204-1, 204-2.

Data leakage is also possible between trusted applications 212 stored on secure storage 114 and operating in secure memory 112. For example, leakage can occur between applications in the same storage and memory space.

Figure 4:
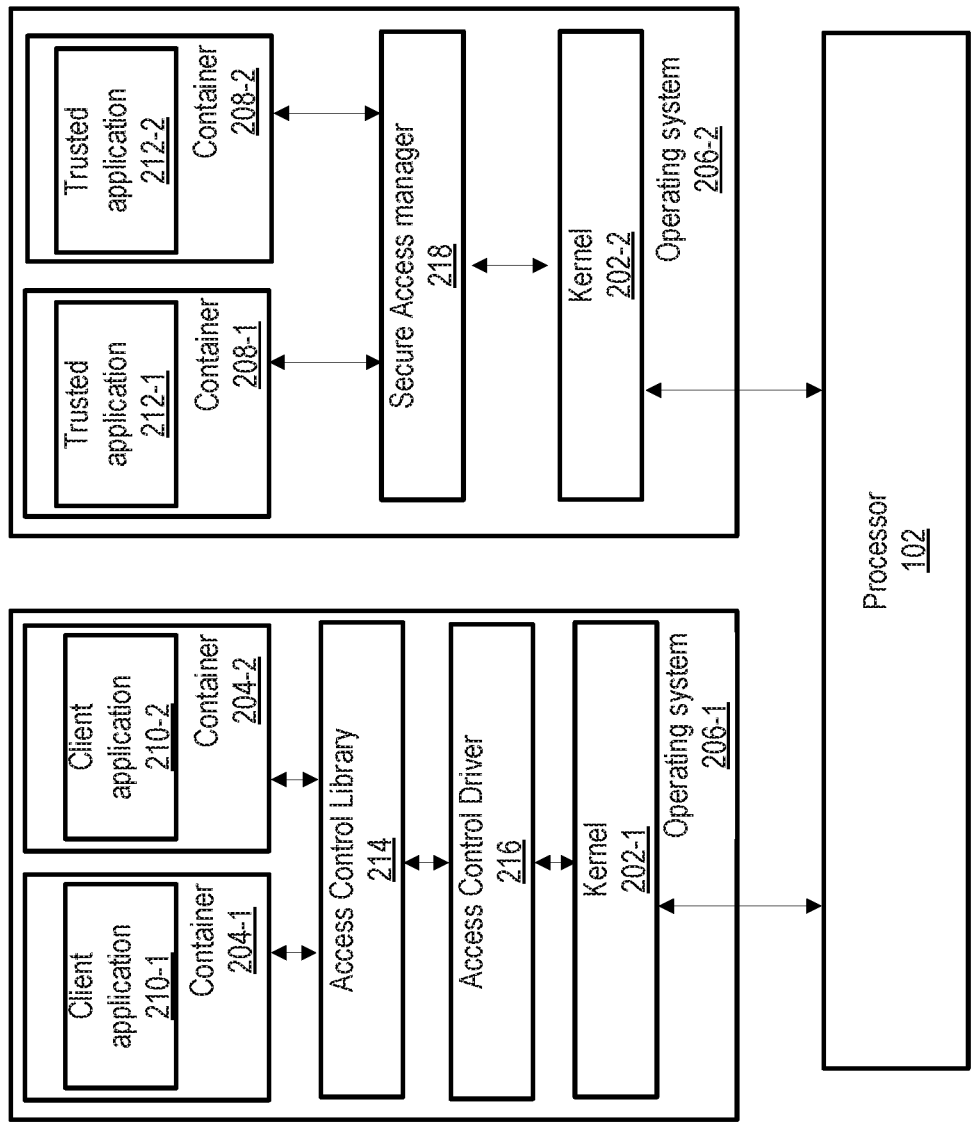
FIG. 4 is a schematic diagram showing another arrangement of software components at the computing device of FIG. 1.

FIG. 4 depicts an embodiment in which operating system 206-2 has secure containers 208-1, 208-2 (individually and collectively, secure containers 208). Each container hosts an instance of an operating system. Operating systems in secure containers 208 are secure operating systems, configured to utilize secure execution technology provided by processor 102.

Secure containers 208-1, 208-2 and their respective trusted applications are stored in different sections of secure storage 114 and operate in different sections of secure memory 112. In some embodiments, the separate sections are defined by different address ranges or different address spaces. In other embodiments, the sections of secure storage 114 and secure memory 112 are defined by discrete storage devices.

Secure containers 208-1, 208-2 segregate their respective trusted applications 212. Secure container 208-1 hosts a first set of trusted applications 212 and secure container 208-2 hosts a second set of trusted applications 212.

Individual secure containers 208 correspond to individual containers 204. That is, each secure container 208 contains secure data and trusted applications 212 for use by client applications of a counterpart container 204. For example, in the depicted embodiment, secure container 208-1 and its trusted applications 212 correspond to personal use container 204-1 and its client applications 210. Secure container 208-2 and its trusted applications 212 correspond to professional use container 204-2 and its client applications 210. As described in further detail hereinafter, client applications 210 within a particular container 204 are only able to access trusted applications 212 in the corresponding secure container 208.

Figure 5:
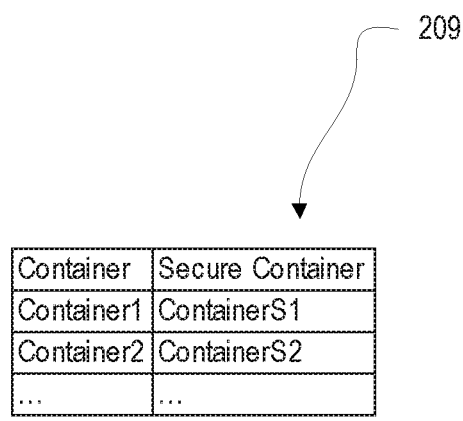
FIG. 5 is a data structure maintained at the computing device of FIG. 1.

One or both of operating systems 206-1, 206-2 maintains a data structure 209 defining concordance between containers 204 and corresponding secure containers 208. FIG. 5 depicts an example data structure 209. In some embodiments, the concordance defined by data structure 209 is also used as a set of access rules for accessing secure computing resources in containers 208.

In the embodiment of FIG. 4, control of access to secure data is managed by discrete software modules within operating systems 206-1, 206-2, rather than individual trusted applications 212. Such components allow for standardization of functions for requesting secure data and for enforcing access rules. In addition, such components allow for access credentials to be created and maintained internally at computing device 100, such that access control need not rely on publicly-available and easily forged information.

In particular, operating system 206-1 further includes an access control library 214 such as an application programming interface (API), which provides a set of functions for receiving requests from client applications 210 in containers 204 for accessing secure data from trusted applications 212 or for performance of operations by trusted applications 212 using secure data. Client applications 210 can invoke functions provided by access control library 214 by constructing requests including parameters such as an identifier of a trusted application 212, an identifier of a function to be performed by the trusted application 212, and other parameters required for authorization or for performance of the function by trusted application 212.

Access control driver 216 and secure access manager 218 have access to data structures 220, 222 (FIGS. 6A-6B, 7A-7B) cataloguing the client applications 210 installed within containers in operating system 206-1 and trusted applications 212 installed within containers in operating system 206-2. Data structures 220, 222 may be maintained by access control driver 216 and secure access manager 218, respectively. Alternatively, data structures 220, 222 may be maintained by other components of operating systems 206-1, 206-2, respectively.

Figure 6A:
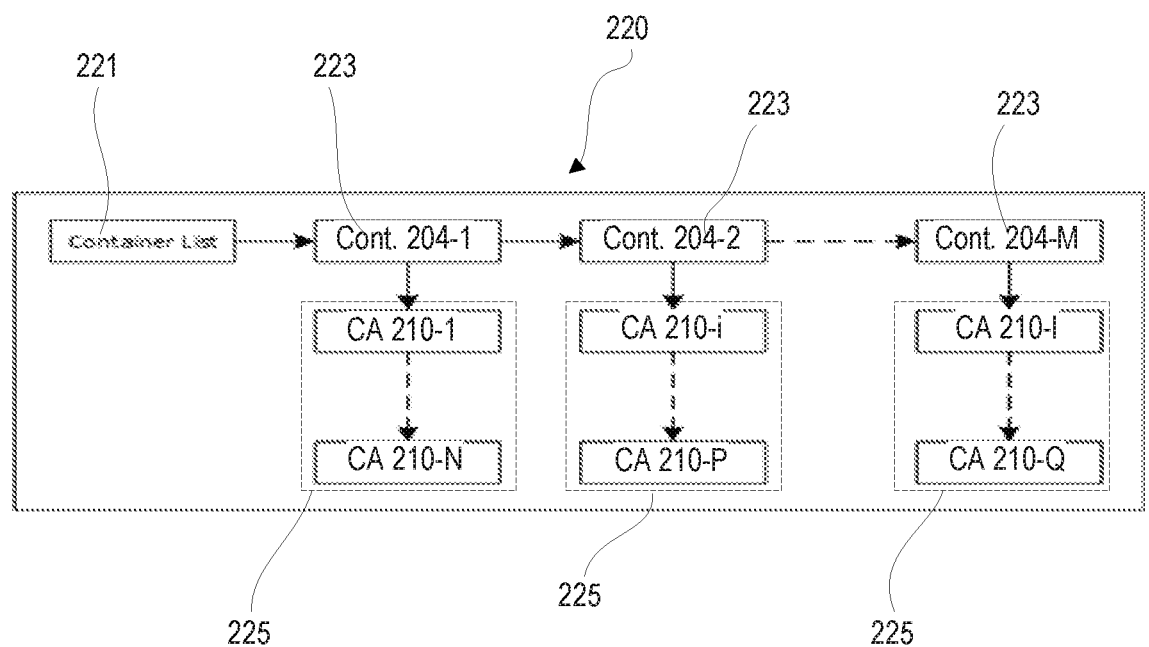
FIGS. 6A-6B are schematic diagrams showing another data structure maintained at the computing device of FIG. 1.
Figure 6B:
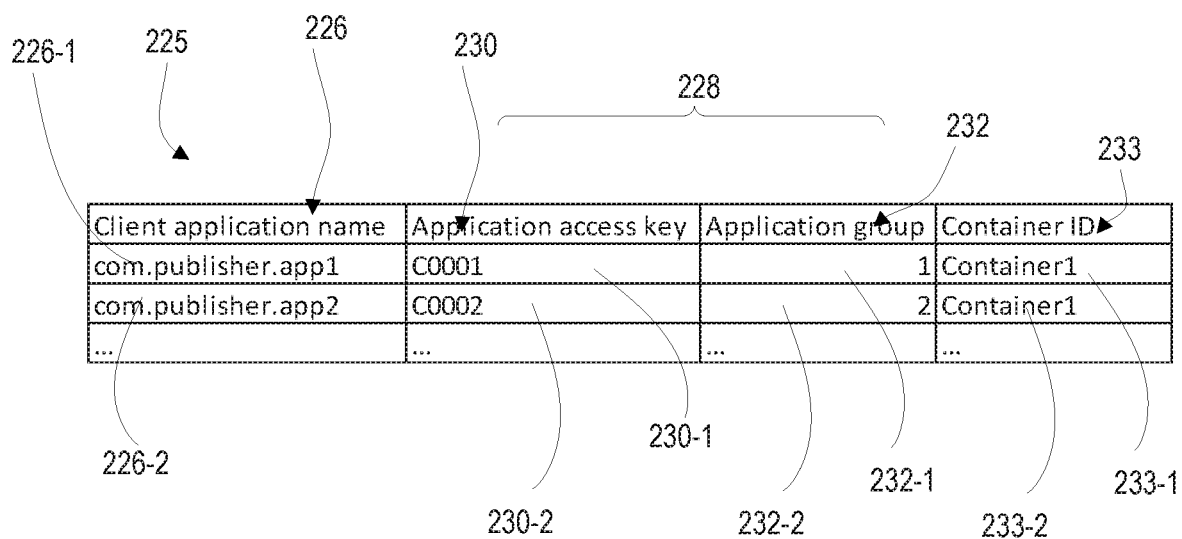

FIGS. 6A-6B depict an example data structure 220 cataloguing client applications 210. As shown in FIG. 6A, data structure 220 contains a container table 221 with entries corresponding to each container 204 hosted at operating system 206-1. The entries have pointers 223 identifying application tables 225. Each application table 225 contains a list of client applications 210 in a particular container 204 and parameters associated with each client application 210. As depicted, container table 221 has entries for M containers 204-1 through 204-M. Each container has a corresponding application table 225. Container 204-1 has N client applications 210-1 through 210-N. Container 204-2 has P client applications 210-i through 210-P. Container 204-M has Q client applications 210-I through 210-Q.

FIG. 6B depicts an example client application table 225. As shown, client application table 225 contains an application name field 226, one or more access credential fields 228, and a container ID field 233. Application name field 226 contains values identifying each application. As shown in FIG. 4, field 226-1 contains identifier "com.publisher.app1" corresponding to client application 210-1 and field 226-2 contains identifier "com.publisher.app2" corresponding to client application 210-2. In the depicted embodiment, access credential fields 228 include an application access key field 230, and an application group ID field 232. However, additional types of access credentials may be used.

Application access key field 230 contains, for each client application 210, a unique identifying value assigned to the client application 210 upon installation. For example, a unique secure access key may be sequentially assigned or derived from the client application name, e.g. using a time-based function, at the time of installation. As depicted, field 230-1 contains secure access key C0001 associated with client application 210-1 and field 230-2 contains secure access key C0002 associated with client application 210-2. In some embodiments, creation of a secure access key for an application within a container 204-1 is prompted by a message sent from software in container 204-1 to operating system 206-1.

Application group field 232 contains, for at least some client applications 210, one or more values defining groups to which the client applications 210 belong. Application groups can include, for example, applications installed by a particular user, applications from a particular developer or publisher, functional groupings (e.g. banking applications, encryption/decryption tools, media applications), or any other suitable grouping. Group values can be assigned based on metadata in application packages, instructions from the user, rules in operating system 206-1 or access control driver 216, or the like. As shown, client application 210-1 belongs to group "1" and client application 210-2 belongs to group "2". In the depicted example, group "2" corresponds to a set of applications using a common encryption/decryption utility, provided by trusted application 212-2. Applications belonging to the group may include, for example, email, messaging and document storage applications associated with the same enterprise. In the depicted example, each of client applications 210-1, 210-2 belongs to one group. However, it is possible for some applications to belong to multiple groups and for other applications to belong to no groups.

Container ID field 233 contains an identifier of the container 204 in which the client application 210 is installed.

A record is added to data structure 220 for each client application 210 upon installation of the client application 210. That is, a record is added to the relevant application table 225 in data structure 220. Likewise upon creation of a new container 204, a new pointer 223 and application table 225 are added to data structure 220.

Figure 7A:
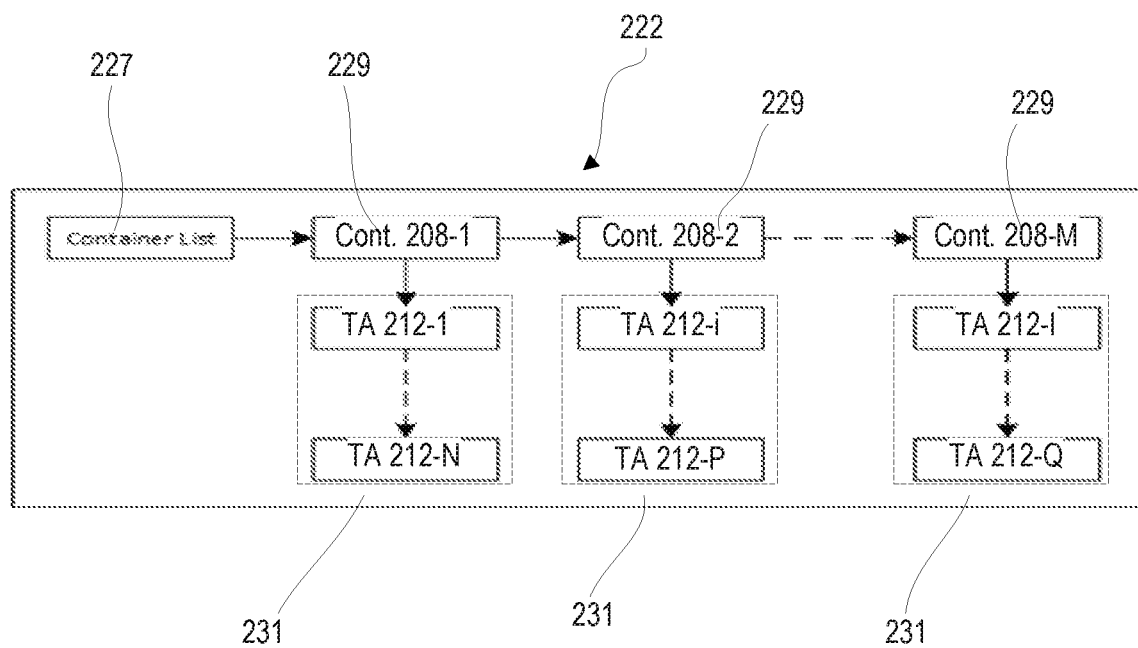
FIGS. 7A-7B are schematic diagrams showing another data structure maintained at the computing device of FIG. 1.
Figure 7B:
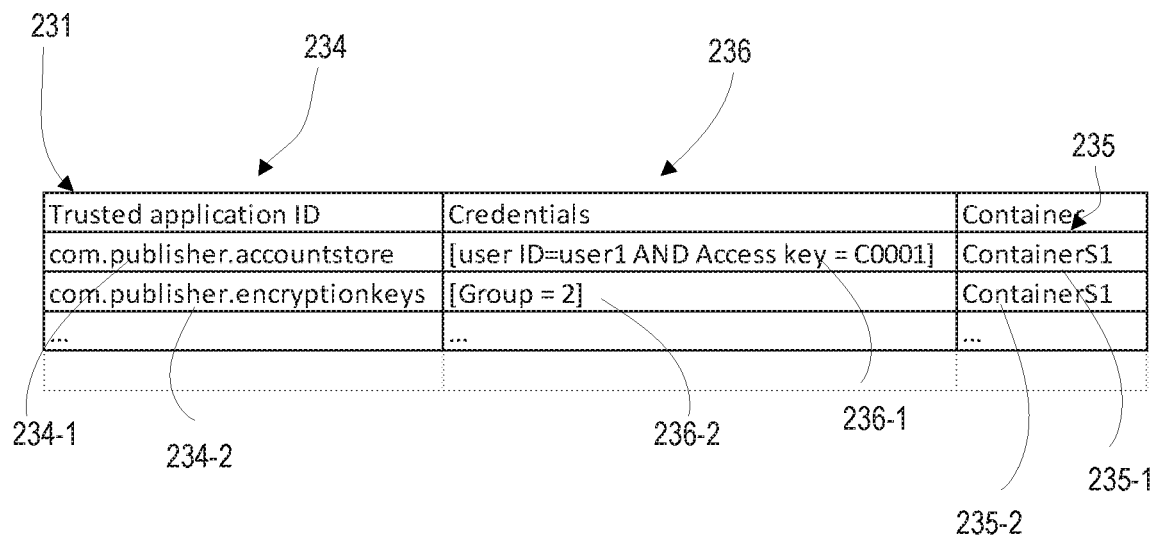

FIGS. 7A-7B depict an example data structure 222 maintained by secure access manager 218 cataloguing trusted applications 212 and containing bindings of trusted applications 212 with access credentials of authorized client applications 210. As shown in FIG. 7A, data structure 222 contains a container table 227 with entries corresponding to each secure container 208 hosted at operating system 206-2. The entries have pointers 229 identifying trusted application tables 231. Each trusted application table 231 contains a list of trusted applications 212 in a particular secure container 208 and parameters defining access requirements for each trusted application 212. As depicted, secure container table 227 has entries for M secure containers 208-1 through 208-M. Each container has a corresponding application table 231. Secure container 208-1 has N trusted applications 212-1 through 212-N. Secure container 208-2 has P trusted applications 212-i through 212-P. Secure container 208-M has Q trusted applications 212-I through 212-Q FIG. 7B depicts an example trusted application table 231. Trusted application table 231 includes a trusted application field 234 containing application ID values for each trusted application 212. As depicted, trusted application field 234-1 contains a value, com.publisher.accountstore, which identifies the trusted application 212-1 responsible for maintaining payment and account credentials. Trusted application field 234-2 contains a value, com.publisher.encryptionkeys, which identifies the trusted application 212-2 responsible for maintaining an encryption/decryption utility. Trusted application table 231 further includes a required credentials field 236 containing credential values or combinations of credential values required for accessing the trusted application. As shown, field 236-1 contains an expression specifying that both a user ID of "user1" and an application access key of "C0001" (corresponding to client application 210-1) are required to access trusted application 212-1. Field 236-2 contains an expression specifying that a group value of "2" is required to access trusted application 212-2. Thus, client applications 210 identified as belonging to that group are authorized. Referring again to FIG. 6B, application group field 232-2 contains value "2", indicating that client application 210-2 belongs to the authorized group for trusted application 212-2. Application group field 232-1 contains value "1", indicating that client application 210-1 does not belong to the authorized group for trusted application 212-2.

In some cases, it may be possible to access a trusted application 212 with multiple credentials or multiple combinations of credentials. For example, more than one user may be authorized to access a particular trusted application 212, in which case credentials associated with any authorized user may be sufficient to gain access to the trusted application 212. In such cases, the possible combinations could be entered as delimited values in a single field. For example, a field could contain multiple delimited user ID values. Alternatively, each combination could be entered in a discrete field.

Trusted application table 231 further includes a secure container field 235, holding an identifier of the trusted container 208 in which each application is installed.

Data structures 220, 222 may be database tables, e.g. relational database tables. However, other structures are possible, as will be apparent to skilled persons from the present disclosure. For example, each of data structures 220, 222 could be implemented as a single table. In such embodiments, the container 204, 208 in which each application is installed may be identified by an entry in container field 233 or secure container field 235, rather than in a separate table.

Data structure 222 is stored in secure storage 114 and therefore can only be modified by secure access manager 218 or other components of operating system 206-2. In some embodiments, secure access manager 218 is configured to modify data structure 222 only based on system-level instructions or instructions from specific digitally-signed application packages. Without limitation, updates to data structure 222 can occur: on installation of client applications 210 or trusted applications 212; as part of system-level software updates issued, for example by the manufacturer of computing device 100; uninstallation of applications; or resetting computing device 100.

In some embodiments, access control driver 216 (FIG. 4) further maintains a record of parameters used to authorize access to each trusted application 212. In the depicted example, access control driver records that trusted application 212-1 can use the application access key and active user ID to authorize a request and that trusted application 212-1 uses only the application access key. In such embodiments, access control driver 216 constructs messages intended for particular trusted applications 212 based on the parameters required to authorize the message. Alternatively, access control driver 216 can include all available parameters with all messages intended for trusted applications 212.

In some embodiments, at least some client applications 210 are installed in containers 204 concurrently with installation of their corresponding trusted applications 212 in secure containers 208. Data structures 220, 222 are updated accordingly upon installation. For example, in some embodiments, a client application 210-2 for encrypted communication and a trusted application 212-2 for encryption/decryption are contained in the same application package. Upon execution of the application package by a user, both of client application 210-2 and trusted application 212-2 are installed. Operating system 206-1 or a component thereof sends an instruction to operating system 206-2 identifying the container 204 in which the client application 210 is installed. Operating system 206-2 then identifies the corresponding container in which to install the trusted application 212. Access control driver 216 assigns an application access key to the client application 210-2 and provides instructions to secure access manager 218 to add a record to data structure 222 linking trusted application 212-2 with the assigned secure access key, so that client application is authorized to access secure data from trusted application 212-2.

Figure 8:
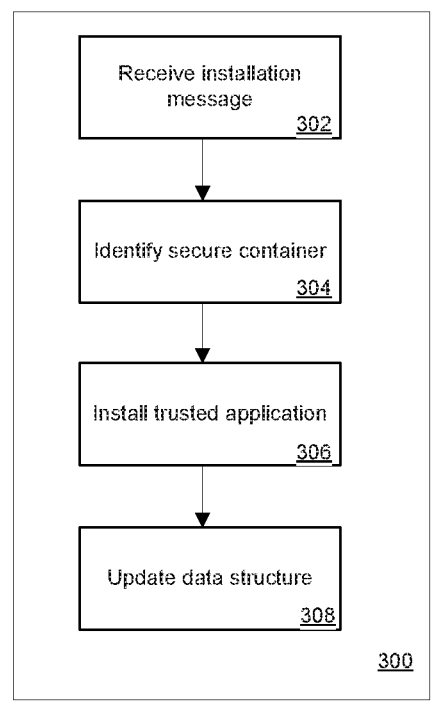
FIG. 8 is a flow chart depicting a method of installing an application in a container of the computing device of FIG. 4.

FIG. 8 depicts an example method 300 of installing a trusted application 212. At block 302, operating system 206-2 receives a message from operating system 206-1 indicating that a trusted application 212 is to be installed. The message identifies a container 204 in which a corresponding client application 210 is installed. At block 304, operating system 206-2 identifies a secure container 208 in which the trusted application is to be installed. The secure container 208 is identified by looking up the container identified at block 302 in data structure 209.

At block 306, the trusted application 212 is installed in the identified secure container 208.

At block 308, secure access manager 218 creates an entry in data structure 222 identifying the trusted application 212, its access requirements and container information.

Alternatively or additionally, trusted applications 212 can be pre-installed in respective secure containers 208, e.g. by the manufacturer of computing device 100. In such cases, an application package containing a client application 210 which requires access to the trusted application 212 also contains instructions for updating data structure 222 to grant access rights to the client application 210. Access control driver 216 processes the instructions and validates the application package as being authorized to modify data structure 222, and passes the modification instructions to secure access manager 218.

Figure 9A:
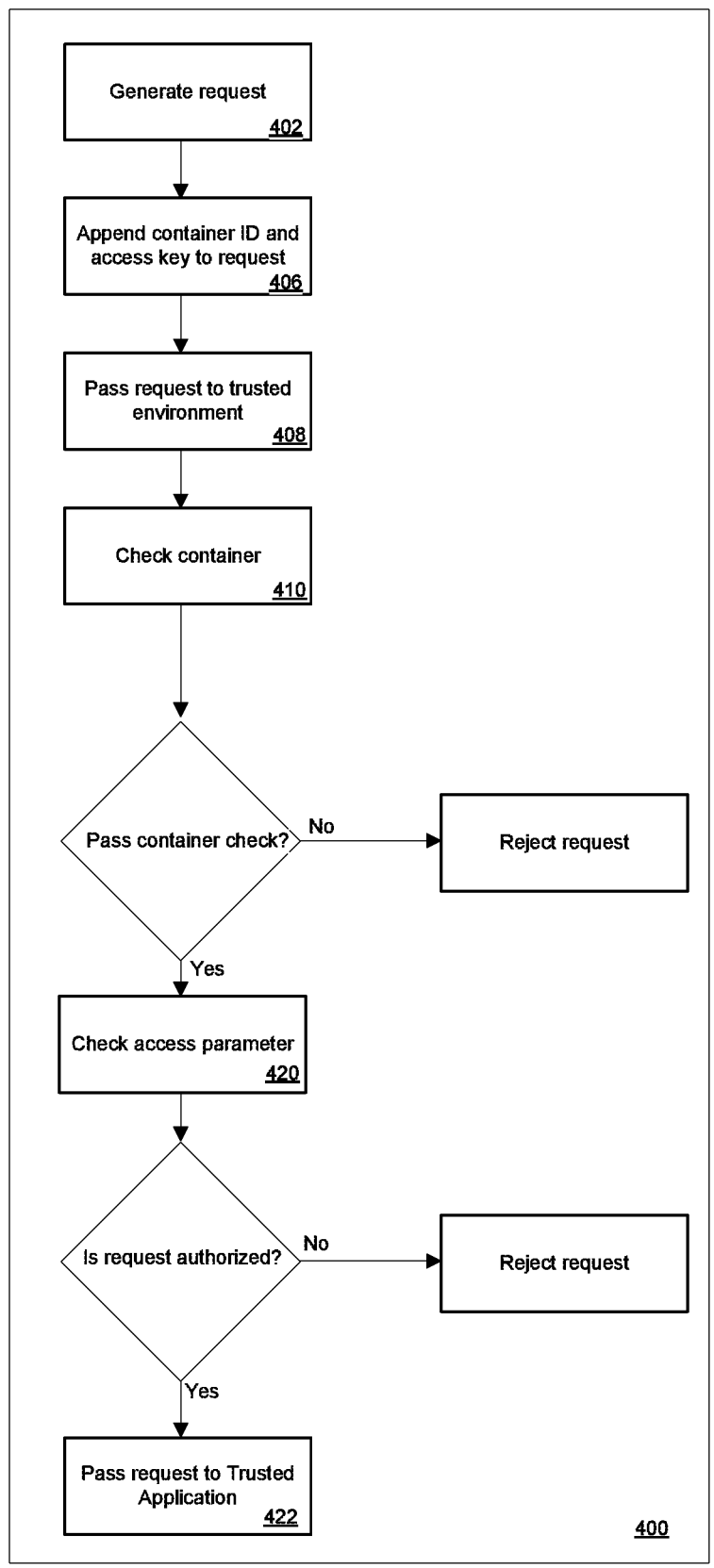
FIGS. 9A-9B are flow charts showing a method of sending a request to a trusted application.
Figure 9B:
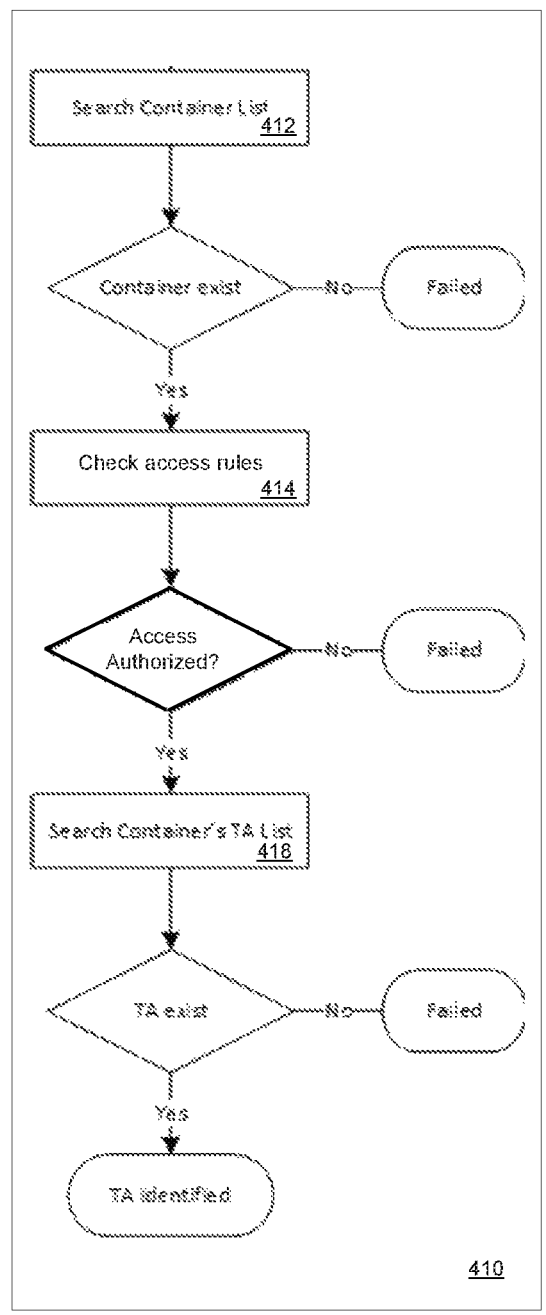
Figure 10:
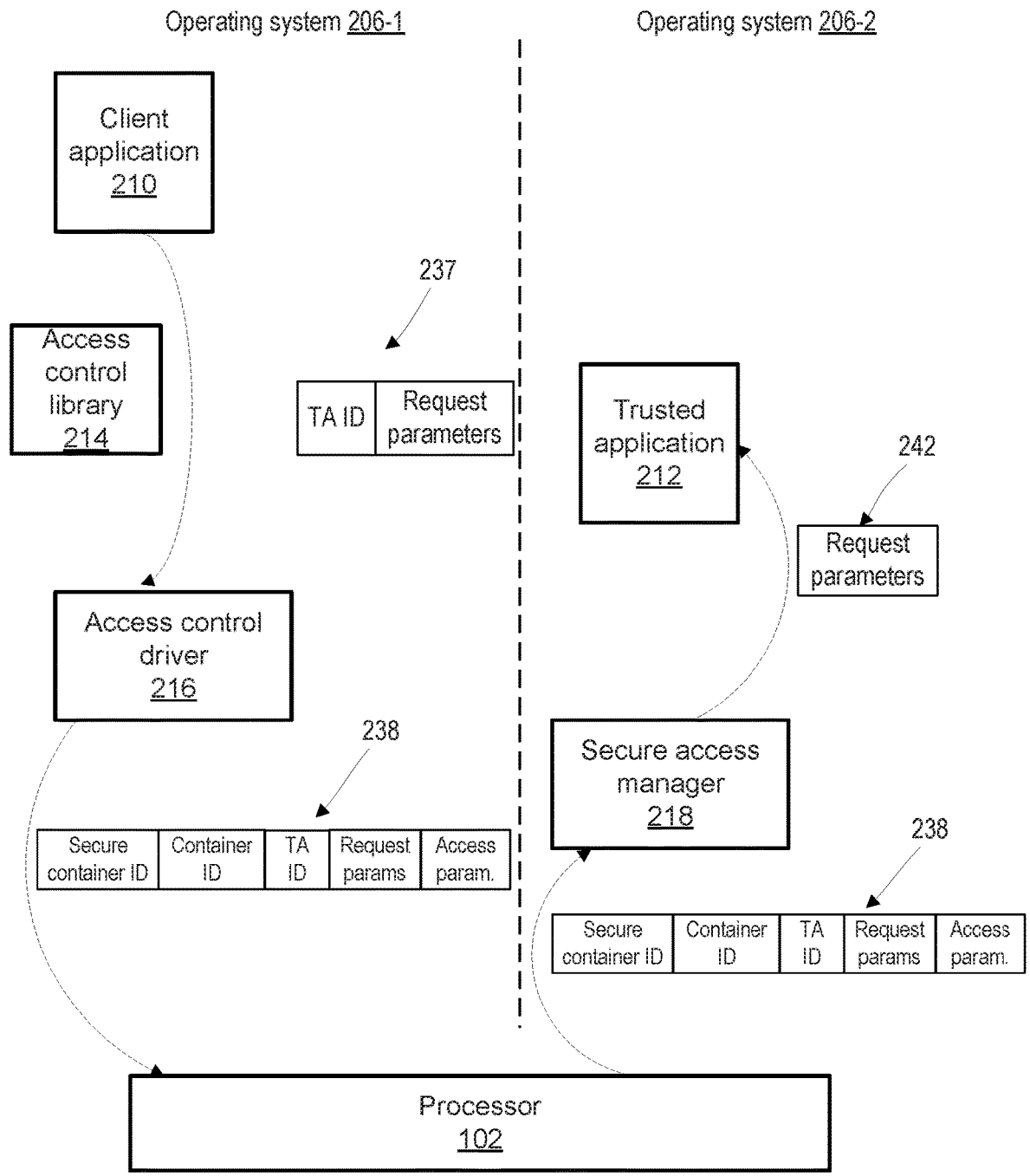
FIG. 10 is a message flow diagram showing messages sent in the method of FIG. 7.

FIGS. 9A-9B are flow charts showing a method 400 of managing access to secure data, performed at computing device 100. FIG. 10 is a schematic diagram showing example messages exchanged among components of computing device 100 in the method of FIGS. 9A-9B.

At block 402, client application 210-1 requests access to secure data. In particular, the client application 210 calls a function provided by access control library 214 for sending requests to trusted applications 212. The client application 210 constructs a message 237 (FIG. 10) containing an identifier of the trusted application 212 for which the request is intended, and parameters defining the request, as indicated by message 237 in FIG. 10.

The request may be a read request, i.e. a request for secure data to be returned. In such cases, the parameters included in message 237 define the data required. For example, a user of computing device 100 enters an input instructing client application 210-1 to present the user's credit card credentials at a point of sale. Client application 210-1 constructs a message 237 including request parameters such as (READ, CARD1), indicating that the request is a read request and that CARD1 is the data to be retrieved.

Alternatively, the request may be a write request i.e. a request to store data in secure storage 114. For example, a user of computing device 100 enters an account number into client application 210-1 for storage, in which case client application 210-1 constructs a message including request parameters such as (WRITE, [account type], [account no.]), indicating that the request is a write request and defining the type of account and number to be saved.

Alternatively, the request may be a request for performance of an operation by a trusted application 212, such as encryption or decryption of data. For example, secure communication client application 210-2 constructs a request intended for trusted application 212-2. The request may be a request for data to be decrypted or encrypted, in which case, the request includes or otherwise identifies the data, or it may be a request to retrieve an encryption key.

The message constructed by the client application 210 is passed from the container 204, in which the client application 210 is installed, to access control driver 216 of operating system 206-1.

At block 406, access control driver 216 identifies the container 204 from which request 237 was received and looks up the corresponding secure container 208 in data structure 209 (FIG. 5) at operating system 206-1. Access control driver 216 further determines the types of access parameters required for accessing the relevant trusted application 212 and looks up those access parameters associated with the client application 210 from which the request originated. For example, as noted, trusted application 212-1, housing payment credentials, requires an application access key to confirm that the requesting client application 210 is authorized and a user ID to confirm that the active user is authorized to access the requested account data. Some access parameters, e.g. application access keys, are retrieved by reading data structure 220. Additional access parameters, e.g. user ID, can be provided by operating system 206-1 or the requesting client application 210. Access control driver 216 forms a request 238 (FIG. 10) including an identifier of the container 204 from which the request originated, an identifier of the corresponding secure container 208, an identifier for the relevant trusted application 212, the appropriate access parameters identified by access control driver 216, and the request parameters received from client application 210.

At block 408, request 238 is passed to operating system 206-2 via processor 102. Specifically, as shown in FIG. 10, a message 238 is passed to secure access manager 218 identifying the container 204 from which the request originated and the relevant trusted application 212-1 and containing the parameters defining the data or operation requested and the access parameter, namely secure access key 228-1.

At block 410, secure access manager 218 performs a container check. FIG. 9B shows detailed steps of the container check at block 410. At block 412, secure access manager 218 searches container table 227 for the secure container 208 identified in request 238. If the container does not exist in table 227, the request fails and an error message may be returned.

If the container 208 identified in request 238 exists in container table 227, at block 414, secure access manager 218 checks access rules for that container 208. In the depicted embodiment, the access rules are provided by the concordance defined in data structure 209. That is, secure access manager 218 checks data structure 209 to verify that the container 204 from which the request 238 originated corresponds to the secure container 208 to which the request 238 is directed. If the access rules are not satisfied, the request fails.

If access rules are satisfied, secure access manager 218 checks the relevant secure container's trusted application table 231 for the trusted application 212 identified in request 238. If the trusted application 212 does not exist in the table 231, the request fails.

If the trusted application 212 is present in the table, secure access manager 218, at block 420, trusted application 212 reads the values in application table 231 and determines whether the combination of access parameters in message 240 appears in a corresponding field 236. If the combination of parameters in message 240 matches a combination of parameters in a corresponding field 236, a communications session is created between the client application 210 which originated the request and the trusted application 212 targeted by the request.

If, as in the depicted example, the received combination of access parameters matches a combination listed in field 236 for the trusted application 212 identified in message 240, the requesting client application 210 is authorized to access the secure computing resource requested (e.g. secure data or trusted application 212). At block 422, secure access manager 218 passes a message 242 to the trusted application 212 containing the parameters defining the request.

If the received combination of access parameters does not match a combination associated with the trusted application 212 in application table 231, the request is not authorized. For example, the user or client application 210 originating the request may not be authorized to access the secure data or perform the operation requested. If so, the request is rejected, that is, secure access manager 218 does not pass the request to the trusted application 212. Optionally, an error message may be returned.

Figure 11:
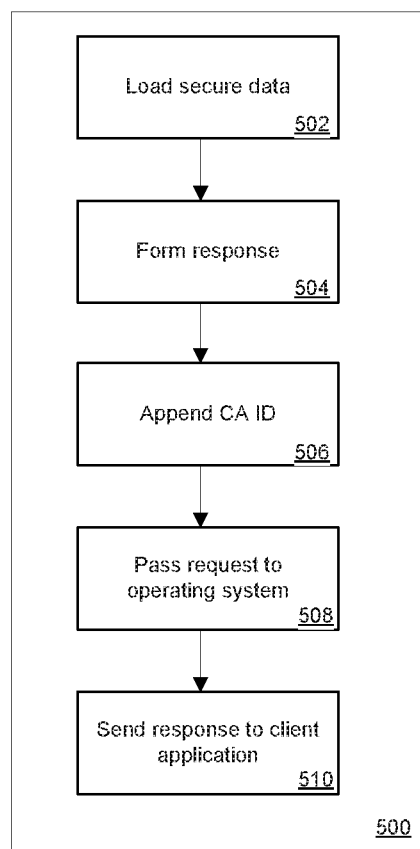
FIG. 11 is a flow chart showing a method of responding to a request.
Figure 12:
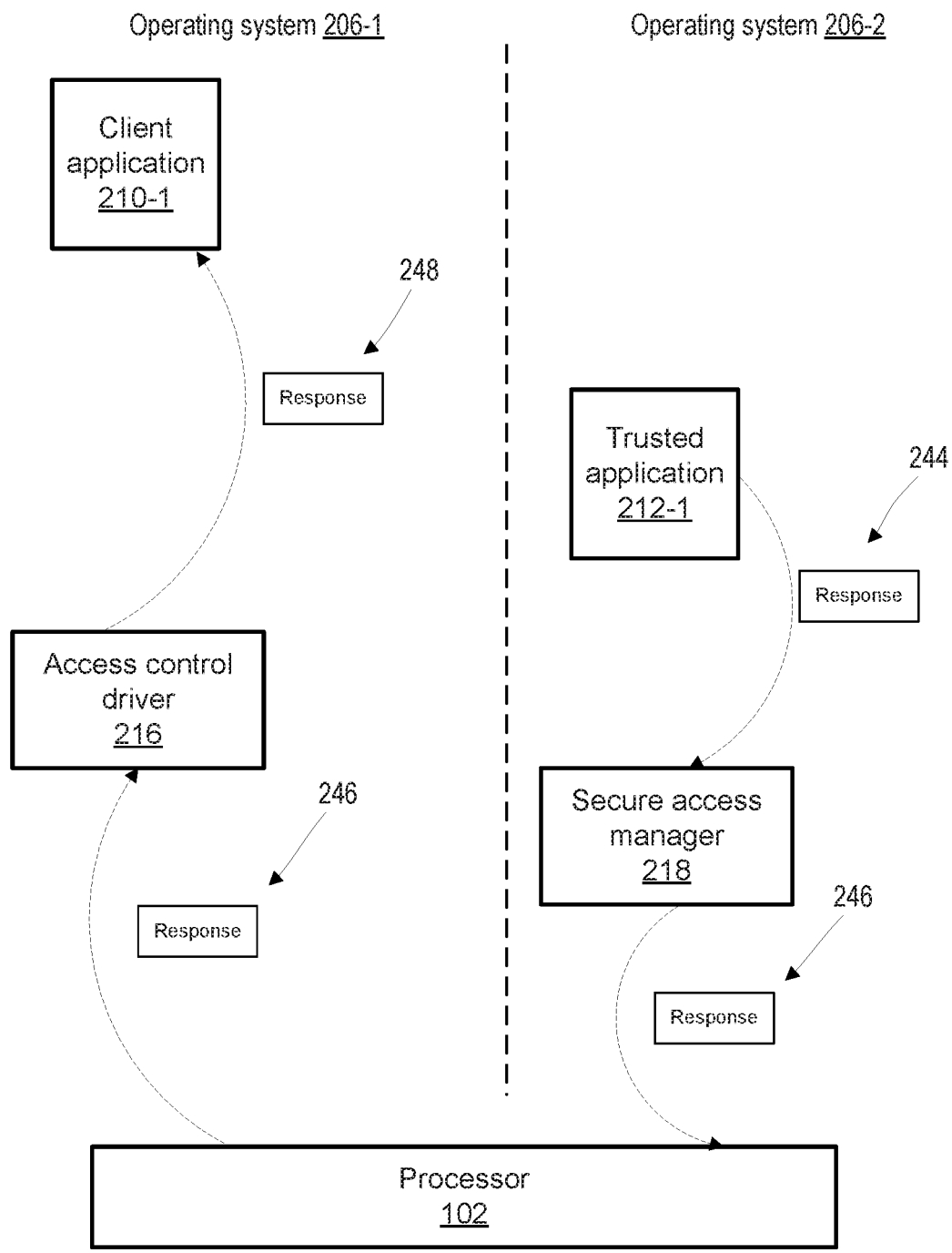
FIG. 12 is a message flow diagram showing messages sent in the method of FIG. 9.

If an authorized request is a write request, trusted application 212 writes the received data to secure storage 114 (FIG. 1). Alternatively, if an authorized request is a read request, trusted application 212 retrieves the requested data for returning to client application 210 in operating system 206-1. If an authorized request is for performance of an operation, e.g. encryption or decryption of data, trusted application 212 performs the application. FIG. 11 depicts a method 500 of returning secure data from a trusted application 212 to a client application 210. FIG. 12 depicts messages sent among components of computing device 100 during method 500.

At block 502, a trusted application 212 carries out the request. For example, the trusted application 212 obtains the secure data requested by client application 210-1. In some examples, the trusted application 212 retrieves data from secure storage 114 and returns the data to client application 210. In other examples, the trusted application 212 writes data received in the request. In still other examples, the trusted application 212 performs an operation, e.g. uses secure data to derive a response. For example, an encryption key may be retrieved from secure storage 114 and used to generate a decrypted value to be returned to a client application 210.

At block 504, trusted application 212 generates a response 244 (FIG. 12) to be returned to the client application 210 and sends the response to secure access manager 218. The message is passed to secure access manager 218.

At block 508, secure access manager 218 sends a message 246 (FIG. 12) to including the response contents to operating system 206-1 by way of processor 102. In particular, secure access manager sends message 246 to access control driver 216.

At block 510, access control driver 216 sends a message 248 (FIG. 12) including the response contents to the client application 210.

Data security may be strengthened by storing each secure container 208 in its own discrete secure storage 114 or address space or range thereof, and by providing each secure container 208 and its applications 212 a discrete secure memory 112 or memory space or range thereof. Such configuration guards against unintentional leakage of data from one secure container 208 to another, and from one secure container 208 to an unauthorized container 204.

In addition, providing containers 208 for trusted applications 212 allows for the installation of multiple instances of a particular trusted application 212. That is, independent instances of a trusted application 212 can be installed in each secure container without creating conflicts or errors in the access control methods and systems described herein. Thus, sets of data, such as personal and enterprise/professional data may be segregated from one another even when the same application is used for both personal and professional purposes.

As will be apparent, operating systems 206-1, 206-2 (e.g. using access control driver 216 and secure access manager 218) handle the identification of containers 204 and secure containers 208, track concordance of individual containers 204 to secure containers 208, identify communications between operating systems 206-1, 206-2 as having originated from a particular container, and verify authorization of requests based on the originating containers. No special adaptation need be made to client applications 210 or trusted applications 212. Thus, client applications 210 and trusted applications 212 need not be aware of containerization within computing device 100. Likewise, developers of client applications 210 and trusted applications 212 need not be aware of containerization.

As described above, data structure 209 defines a concordance between containers 204 and secure containers 208. The concordance is used as a set of rules for accessing secure computing resources in containers 208. That is, any given secure container 208 can be accessed only through requests originating from the corresponding container 204. In other embodiments, access rules may be defined differently. For example, any of the access requirements defined for trusted applications 212 in applications table 231 (FIG. 7B) could be used to control access at the secure container level. Such rules may be added to data structure 209.

Figure 13:
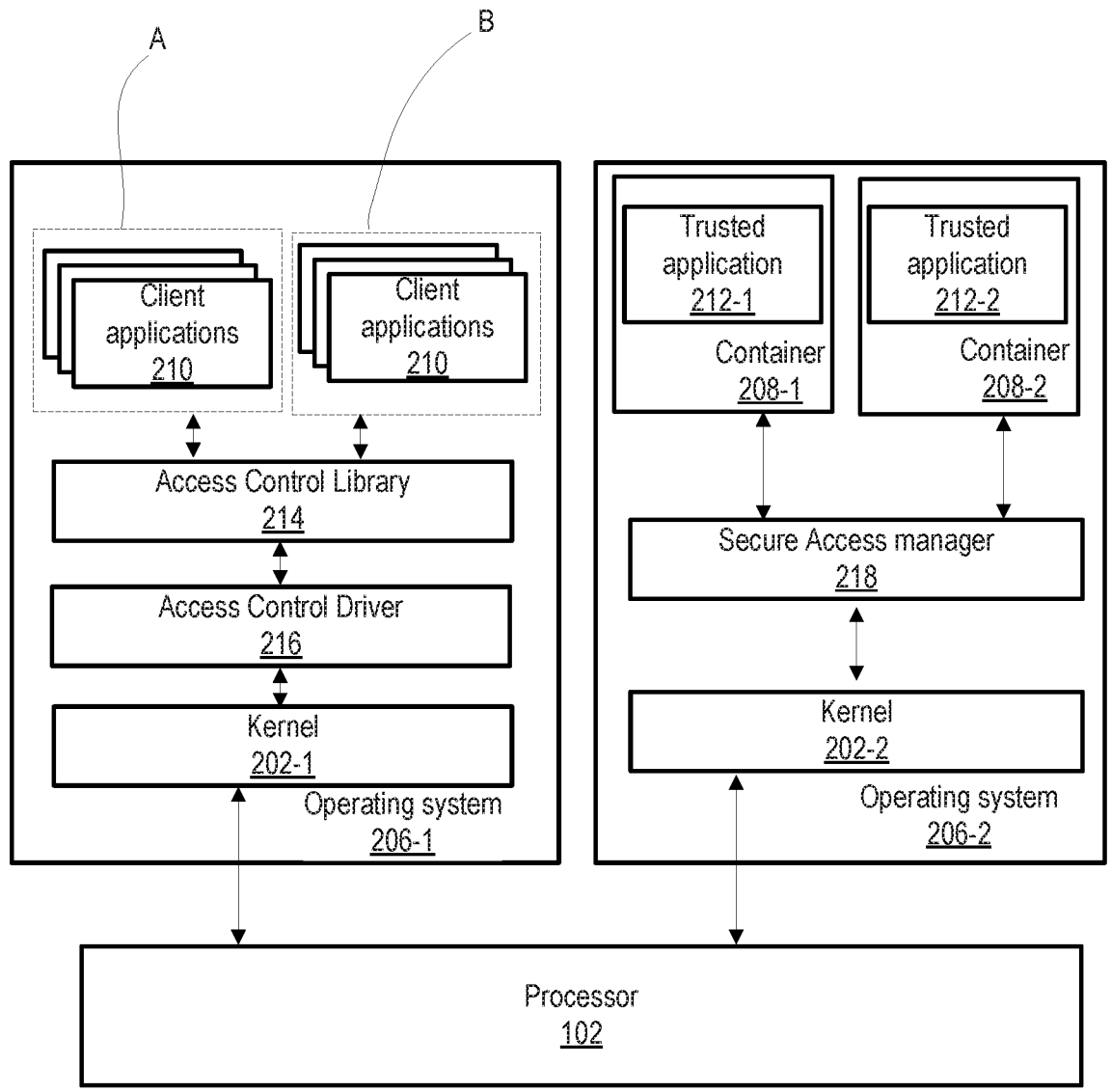
FIG. 13 is a schematic diagram showing another arrangement of software components at the computing device of FIG. 1.

FIG. 13 depicts an embodiment with client applications 210 installed directly in operating system 206-1, rather than within containers 204. The client applications 210 in operating system 206-1 include a first group A and a second group B. Group A is, for example, a set of personal applications such as payment. Group B is, for example, a set of enterprise applications such as encrypted communication applications. Secure container 208-1 contains a trusted application 212-1 through which payment credentials can be accessed. Secure container 208-2 contains a trusted application 212-2 with secure communication resources such as encryption/decryption keys. In the embodiment of FIG. 13, rules for accessing containers 208-1, 208-2 and secure computing resources therein are based on application groups. Application tables 225 include values identifying groups to which applications belong. Data structure 209 (FIG. 5) includes values identifying groups authorized to access secure containers 208. Access control driver 216 is configured to construct requests including group identifiers. Secure access manager 218 is configured to pass the requests to the targeted secure container 208 if the relevant group is authorized based on the rules defined by data structure 209.

Figure 14:
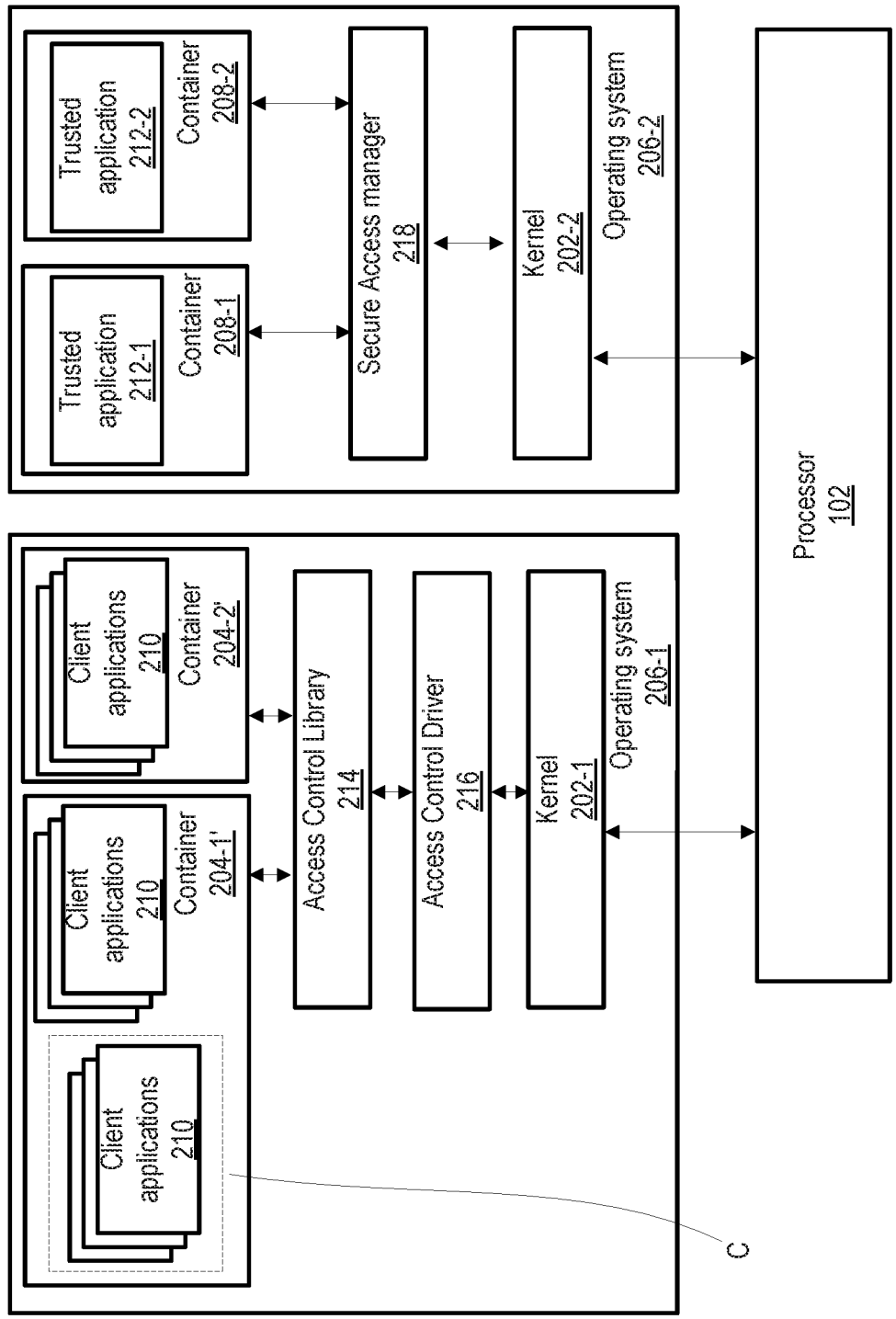
FIG. 14 is a schematic diagram showing another arrangement of software components at the computing device of FIG. 1.

Rules for accessing secure containers 208 may be based on any suitable combination of the criteria described above. For example, FIG. 14 depicts an embodiment with two containers 204-1', 204-2' in operating system 206-1. Client applications 210 are installed within each of containers 204-1' and 204-2'. A subset of client applications 210 in container 204-1' belong to a group C. In the embodiment of FIG. 14, data structure 209 defines a concordance between containers 204, 208 and further contains values defining groups authorized to access particular containers 208.

As will be apparent, container access rules based on other combinations of criteria are possible.

As described with reference to the embodiments of FIGS. 4-12, control of access to trusted applications 212 and to secure data stored by trusted applications 212 is centrally managed by secure access manager 218 in concert with and using information provided by access control library 214 and access control driver 216. Access control measures need not be implemented by either of client applications 210 or trusted applications 212. Rather, client applications 210, trusted applications 212 can simply define the desired access controls, e.g. using metadata in application packages, and rely on access control library 214, access control driver 216 and secure access manager 218 to implement such controls. Access control library 214, access control driver 216 and secure access manager 218 reflect the desired access rules in data structures 220, 222.

Centralized implementation of access control in this manner allows for standardization of access controls among client applications 210, trusted applications 212. For example, code to limit access to specific client applications or users is implemented in access control driver 216 and secure access manager 218, and client applications 210, trusted applications 218 can simply rely on the access control driver 216 and secure access manager 218 for such functions. Thus, vulnerabilities associated with incorrect implementations by individual applications can be avoided. Moreover, in the event of a security vulnerability being identified, the vulnerability can be addressed for all applications by updating one or more of access control library 214, access control driver 216 or security access manager 218. In contrast, if access controls were implemented by individual client applications 210 or trusted applications 212, addressing vulnerabilities could require updating every application.

Handling of access control functions by operating system components, e.g. access control library 214, access control driver 216 and secure access manager 218, also eases development of client applications 210 and trusted applications 212, as developers of individual applications need not implement custom access controls in each application. Ease of development may tend to encourage the development of applications that utilize secure memory 112 and secure storage 114 and therefore may contribute to the expansion of capabilities of computing devices such as computing device 100.

As described above with reference to FIG. 8, each request generated by a client application 210 includes an identification of the trusted application 212 for which the request is intended. Client applications 210 are aware of trusted applications 212 with which they are designed to interact. That is, client applications 210 are programmed to rely on trusted applications 212 for some data or for performance of some operations, and to form requests identifying those trusted applications and including the relevant parameters. In other embodiments, access control library 214 may provide multiple functions, specific to types of data available from trusted applications 212 and types of operations that can be performed by trusted applications 212. In such embodiments, access control library 214 further maintains a concordance between each function and the respective trusted application, and defines the parameters required for each function, each as part of an API. Thus, client applications 210 can be configured to rely on functions provided by access control library 124 and need not explicitly identify trusted applications 212.

In some embodiments, components and features of the systems and methods disclosed herein can be implemented according to Global Platform Trusted Execution Environment (TEE) specifications, accessible on the internet at www.globalplatform.org/specificationsdevice.asp. For example, in some embodiments, mobile computing device 100 is compliant with Global Platform TEE System Architecture v1.0 and operating system 206-2 is compliant with the trusted execution environment specifications defined therein. Moreover, in some embodiments, operating systems 206-1, 206-2 and computing device 100 implement Global Platform TEE API specifications such as TEE Client API Specification v1.0 and TEE Internal Core API Specification v1.1.1.1 and communication between operating system 206-1 and operating system 206-2 occurs according to such specifications, all of which are incorporated herein by reference. The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the detailed embodiments described above and illustrated are intended to be examples only. Modifications are possible. The invention is defined by the claims.

What is claimed is:

1. A computing device, comprising:
  a hardware processor;
    a first memory storing instructions of a first operating system which, when executed by the hardware processor, cause said first operating system to host a plurality of first containers providing separate execution environments, each of said plurality of first containers hosting a client application;

a second secure memory storing instructions of a second operating system which, when executed by the hardware processor, cause the second operating system to:

host a plurality of second containers providing separate execution environments, each of said plurality of second containers hosting a trusted application; and receive, at a secure access manager, an access request sent by one of client applications hosted in one of said plurality of first containers, said access request including a value identifying said client application, a value identifying one of said plurality of first containers hosted by said first operating system, a value identifying one of trusted applications and a value identifying one of said plurality of second containers hosted by said second operating system; and selectively pass said access request to said one of said trusted applications based on container access rules regarding sharing of information between said trusted applications and said client applications.

2. The computing device of claim 1, wherein said container access rules comprise a concordance between said plurality of first containers hosted by said first operating system and said plurality of second containers hosted by said second operating system.

3. The computing device of claim 1, wherein said instructions of said first operating system, when executed by said hardware processor, cause an access control driver to add said value identifying said one of said plurality of first containers hosting said one of said client applications from which the access request was sent to said access request.

4. The computing device of claim 3, wherein said container access rules depend on said value identifying said one of said plurality of first containers hosting said one of said client applications from which the access request was sent.

5. The computing device of claim 1, wherein first and second containers of said plurality of second containers hosted by said second operating system have respective instances of said trusted application.

6. The computing device of claim 1, wherein said access requests comprises a request for return of secure data.

7. The computing device of claim 1, wherein said access requests comprises a requests to perform operations using secure computing resources.

8. The computing device of claim 1, wherein said container access rules comprise a definition of a group of said client applications authorized to access a second container of said plurality of second containers hosted by said second operating system.

9. The computing device of claim 1, wherein said first operating system defines a rich execution environment and said second operating system defines a trusted execution environment, each as defined by the Global Platform Trusted Execution Environment system architecture.

10. A method of access control on a computing device comprising a first memory storing instructions of a first operating system which, when executed by a processor, cause said first operating system to host a plurality of first containers providing separate execution environments, each of said plurality of first containers hosting a client application, and a second secure memory storing instructions of a second operating system which, when executed by the processor, cause the second operating system to host a plurality of second containers hosting a trusted application, the method comprising:

sending, by one of client applications hosted in one of said plurality of first containers, an access request, said access request including a value identifying said client application, a value identifying one of said plurality of first containers hosted by said first operating system, a value identifying one of trusted applications and a value identifying one of said plurality of second containers hosted by said second operating system;

receiving, at a secure access manager, said access request;

evaluating said access request according to access rules regarding sharing of information between said trusted applications and said client applications; and selectively passing said access request to said one of said trusted applications based on said access rules.

11. The method of claim 10, comprising adding, by an access control driver, said value identifying said one of said plurality of first containers hosting said one of said client applications from which the access request was sent to said access request, and sending said access request to said secure access manager with said value identifying said one of said plurality of first containers hosting said one of said client applications from which the access request was sent.

12. The method of claim 11, wherein said evaluating said access request comprises checking a concordance between said plurality of first containers hosted by said first operating system and said plurality of second containers hosted by said second operating system.

13. The method of claim 12, wherein said evaluating said access request comprises checking said value identifying said one of said trusted applications against a list of trusted applications in said one of said plurality of second containers.

14. The method of claim 12, wherein first and second ones of said second containers hosted by said second operating system have respective instances of said trusted application.

15. The method of claim 10, wherein said evaluating said access request comprises checking said value identifying said one of said plurality of second containers hosted by said second operating system against a list of second containers hosted by said second operating system.

16. The method of claim 10, and wherein said evaluating said access request comprises reading a data structure defining a group of client applications authorized to access a second container hosted by said second operating system.

17. A non-transitory computer-readable medium, having instructions stored thereon for execution by a processor, said instructions comprising:

first instructions of a first operating system which, when executed by the processor, cause said first operating system to:

host a plurality of first containers providing separate execution environments, each of said plurality of first containers hosting a client application; and send an access request from one of client applications hosted in one of said plurality of first containers to a secure access manager, said access request including a value identifying said client application, a value identifying one of said plurality of first containers hosted by said first operating system, a value identifying one of trusted applications and a value identifying one of a plurality of second containers hosted by a second operating system;

second instructions of said second operating system which, when executed by the processor, cause the second operating system to:
host said plurality of second containers providing separate execution environments, each of said plurality of second containers hosting a trusted application;
receive said access request;
evaluate said access request according to access rules regarding sharing of information between said trusted applications and said client applications; and
selectively passing said access request to said one of said trusted applications based on said access rules.

18. The non-transitory computer-readable medium of claim 17, wherein said access request is sent from one of said plurality of first containers of said first operating system.

* * * * *

UNITED STATES PATENT AND TRADEMARK OFFICE
CERTIFICATE OF CORRECTION

PATENT NO. : 10,528,749 B2
APPLICATION NO. : 15/463539
DATED : January 7, 2020
INVENTOR(S) : Zhigang Luo et al.

It is certified that error appears in the above-identified patent and that said Letters Patent is hereby corrected as shown below:

In the Claims

In Column 17, Line 48, Claim 6, delete "requests" and insert --request--.

In Column 17, Line 50, Claim 7, delete "requests comprises a requests" and insert --request comprises a request--.

In Column 17, Line 60, Claim 9, delete "the Global Platform" and insert --a Global Platform--.

Signed and Sealed this
Fourth Day of August, 2020

Andrei Iancu
*Director of the United States Patent and Trademark Office*